Figure 1:
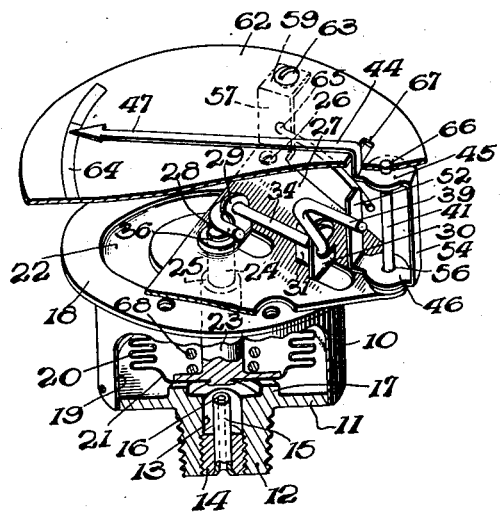

Aug. 26, 1941.   J. E. DUBE   2,253,769

PRESSURE GAUGE

Filed July 27, 1938

Inventor

John E. Dube.

By Cameron, Kerkam & Sutton
Attorneys

Patented Aug. 26, 1941

2,253,769

UNITED STATES PATENT OFFICE 2,253,769

PRESSURE GAUGE

John E. Dube, Knoxville, Tenn., assignor to The Fulton Sylphon Company, Knoxville, Tenn., a corporation of Delaware Application July 27, 1938, Serial No. 221,583

4 Claims. (Cl. 73—110)

This invention relates to pressure gauges, and more particularly to a pressure gauge of the type in which a pressure responsive diaphragm or bellows is operatively connected to a pointer or the like in indicating relationship with a dial or the like.

It is an object of this invention to provide a pressure gauge which is simple in construction, composed of a relatively small number of inexpensively fabricated parts, easy to assemble and calibrate, and yet accurate and efficient in its gauging of pressure.

Other objects of this invention will appear as the description thereof proceeds.

The invention is capable of receiving a variety of mechanical expressions, one of which is shown on the accompanying drawing, but it is to be expressly understood that the drawing is for purposes of illustration only, and is not to be construed as a definition of the limits of the invention, reference being had to the appended claims for that purpose.

Figure 2:
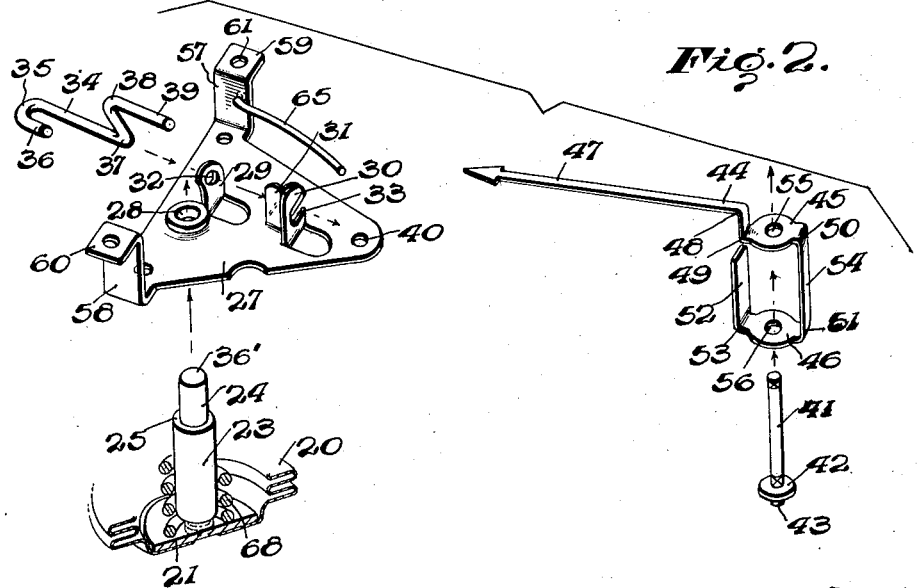

Referring in detail to the drawing, wherein similar reference characters are employed to designate corresponding parts in different figures, Fig. 1 is a perspective view, partly in section, illustrating an embodiment of the present invention; and Fig. 2 is an exploded view of the elements composing the interior elements of the embodiment illustrated in Fig. 1.

In the form shown, a casing 10 of any suitable size, shape, material and construction, has attached thereto or formed integrally therewith an end wall 11 provided with an exteriorly projecting, and exteriorly threaded, boss 12 by which the same may be mounted in any suitable aperture, pipe connection, or the like. Boss 12 is provided with a passage 13 extending axially therethrough, and as here shown means providing a reduced orifice are suitably mounted in said aperture 13, the construction shown including a threaded and apertured plug 14 adapted to be threaded into the tapped portion of passage 13 and having suitably secured therein an inwardly projecting tubular member 15 providing an orifice 16 of suitable size. Interiorly of the casing 10, wall 11 is shown as provided with an inwardly projecting annular ledge 17 which is adapted to act as a seat for the flexible member to be described.

At the opposite end of casing 10 there is provided, either integrally therewith or suitably attached thereto, an outwardly projecting flange 18 by which casing 10 may be mounted in any suitable way in a housing (not shown because constituting no part of the present invention) of any suitable construction. The end of the casing 10 with which the flange 18 is associated is closed in any suitable way so that the chamber 19 therein constitutes a pressure chamber, the fluid under pressure to be gauged being admitted to the interior of said chamber 19 through the orifice 16 provided as described in the passage through the threaded boss 12. Disposed within said chamber 19 is an expansible and collapsible corrugated tubular metallic wall 20 having a movable end 21 suitably attached thereto or formed integrally therewith, and having its opposite and relatively stationary end secured in any suitable way to the wall or member 22 which closes the end of the chamber 19 heretofore referred to.

Movable end wall 21 of the diaphragm or bellows 20 has attached thereto in any suitable way a post 23, which is here shown as reduced in diameter adjacent its outer end as shown at 24, said portion 24 of post 23 projecting through an aperture in the member 22 with the shoulder 25 preferably so located with respect to the member 22 that it cooperates with said member 22 to constitute a stop for predetermining the extent of outward movement of the post 23 under pressure applied to the movable end wall 21 of bellows 20.

Suitably attached to the flange 18, as by a plurality of screws, one of which is indicated at 26, or spot welding, etc., is a triangularly shaped base plate 27 provided with an aperture 28 in alignment with and of a size to slidingly receive the reduced end 24 of post 23. As shown, said aperture 28 may be formed in an eyelet-like member suitably secured in an aperture in the base plate 27, or it may be formed as a projection on the member to which the bellows 20 is attached and engage in and project through the aperture in the base plate 27 for purposes of locating the same. Base plate 27 is provided with suitable cuts whereby two parallel lugs 29 and 30 may be bent up therefrom, and also a third lug 31 which is designed to lie in a plane at right angles to said lugs 29 and 30 for a purpose to be explained. Lug 29 is preferably adjacent the aperture 28, while lug 30 is in alignment therewith and at a substantial distance therefrom so that the two lugs 29 and 30 provide spaced bearings for a crankshaft to be described. Lug 29 is provided with an aperture 32 of a size to rotatably receive and constitute a bearing for the crankshaft, while lug 30 is provided with a slot 33 extending thereinto and having a width such that it also constitutes a bearing for the crankshaft when the crankshaft is inserted laterally thereinto, after which the lug 31 is bent up to hold the crankshaft in place and against lateral displacement.

The crankshaft 34 is preferably formed from a rod of small diameter and has at one end a U-shaped bend 35 of such size that the free end 36 thereof will lie on the end 36' of the post 23 when the crankshaft 34 is assembled in the lugs 29 and 30. At its opposite end the crankshaft 34 is provided with a pair of angular bends 37 and 38, each here shown as approximating a right angle, so that end 39 of said crankshaft is approximately parallel to the body thereof. Crankshaft 34 may be assembled in the lugs 29 and 30 by suitably hooking the end 36 into the aperture 32 and then moving the body portion 34 laterally into the slot 33, into the assembled relationship shown in Fig. 1, after which it is retained in place by the lug 31.

At the point of the triangle which is generally in alignment with the direction of extension of the crankshaft 34 base plate 27 is provided with an aperture 40, and mounted therein in any suitable way is a pivot pin 41, here shown as provided with a collar 42 adjacent the end thereof so that the end 43 of said pin 41 may be engaged in the aperture 40 and stationarily secured therein in any suitable way with the collar 42 holding said pivot pin at right angles to the plane of the base plate 27.

Rotatably mounted on said pin 41 is a pointer member 44, here shown as formed from an elongated strip of sheet metal provided with a pair of intermediate enlargements 45 and 46. As shown, pointer 44 has a long pointer proper, designated 47, which extends from and is united to the portion 45 by a pair of right angular bends 48 and 49. The strip between the enlarged portions 45 and 46 is bent right angularly at 50 and 51, while the end portion 52 is bent right angularly at 53, so that in final form the portions 45 and 46 are substantially parallel and in alignment and connected by a portion 54 at right angles thereto, while portion 52 is substantially parallel to section 54, so that together they constitute a substantially rectangular open element, as clearly shown in Fig. 2, from which the pointer proper 47 projects in a plane that is substantially parallel to but spaced from the portion 45. Portions 45 and 46 are provided with aligned apertures 55 and 56 of a size adapted to receive pivot pin 41 and provide a bearing thereon.

Base plate 27 at the corners opposite the aperture 40 is provided with a pair of strip-like extensions 57 and 58 which are provided with two right angularly directed bends so as to provide a pair of attaching portions 59 and 60 spaced from but in a plane substantially parallel to the base plate 27. Said extensions 57 and 58 therefore constitute attachment lugs which project from the base plate 27 a sufficient distance so that a face plate or dial may be attached thereto without interfering with the crankshaft 34 or the operation of pointer element 44 within the space between such dial and the base plate 27. The attaching portions 59 and 60 are apertured as shown at 61 and a face plate or dial 62 of any suitable size, construction, material, etc., is attached thereto, as by screw 63, and provided with any suitable indicia at 64 for cooperation with the pointer 47. When the pointer element is mounted on the pivot pin 41 one lateral edge of end portion 52 is adapted to engage the end portion 39 of crankshaft 34, and to retain these members in operative contact a spring 65 is suitably mounted on the lug 57 and has its free end in engagement with the opposite edge of pointer portion 52. Spring 65 may be a leaf spring or, as shown, it may take the form of a resilient wire having a slight curvature and mounted at one end in an aperture in the lug 57. End portion 52 of the pointer element is preferably provided with straight substantially parallel edges for engagement with the end 39 of the crankshaft and the spring 65, respectively.

The end of pivot 41 preferably projects beyond the end portion 45 of the pointer element and is adapted to be engaged in an aperture 66 in the dial plate 62. Thereby the pivot pin 41 is rigidly mounted at its opposite ends to prevent its getting out of alignment, and at the same time the pointer element is secured on said pivot pin 41, against displacement therefrom, when the aperture 66 in the dial plate 62 is engaged with the end of the pivot pin 41. Dial plate 62 is also provided with an arcuate slot 67 to receive the right angularly bent portion 48, 49 of the pointer 44, said slot 67 being preferably made of such length that it cooperates with the pointer element 44 to constitute a stop therefor when no pressure is on the bellows 20 and spring 65 holds the pointer element 44 at one limit of its movement.

When the pressure in the chamber 19 is below that at which the gauge is intended to indicate pressure, the end wall 21 of bellows 20 is preferably engaged with seat 17. While the inherent resilience in the member 20 may be relied upon to seat said end wall 21 on seat 17 under such conditions, a coil spring 68 is preferably provided in the bellows 20 and reacts between the movable and stationary end walls thereof so as to engage the end wall 21 on the seat 17 when the pressure in chamber 19 is below the predetermined pressure.

The structure so far described is adapted to be mounted in any suitable casing provided with any suitable crystal and bezel, but these have not been illustrated as they constitute no part of the present invention.

The assembly and operation of the parts are believed to be evident from the foregoing description. The pressure admitted through the orifice 16 to the chamber 19 is applied to end wall 21 of bellows 20, and when the pressure has attained that value at which the gauge is designed to come into operation, as determined by the strength of the spring 68, plus the inherent resilience of the bellows 20 and the resilience of the spring 65, movable end wall 21 is lifted off of seat 17 and the post 23 is caused to project through the aperture 28. The engagement of the end 36' of post 23 with the end 36 of the crankshaft 34 at a lateral distance from the rotary axis thereof causes said crankshaft 34 to rotate in its bearings 32 and 33, and the offset end 39 of said crankshaft thus moves the end portion 52 of the pointer element around its pivot 41 to cause the pointer 47 to indicate the existing pressure on the indicia 64. The spring 65 normally holds the end portion 52 in contact with the offset portion 39 of the crankshaft 34, and therefore there is no lost motion, so that the position of the pointer 47 with respect to its indicia 64 is accurately determined by the pressure on and extent of displacement of the movable end wall 21 of the bellows 20.

Pointer 47 is preferably made sufficiently flexible or bendable so that in initially calibrating the instrument said pointer may be bent at or adjacent its junction with the open rectangular portion by which it is mounted on the pivot pin 41 so as to align the pointer with the proper indicating mark. The displacement of movable end wall 21 under variations in pressure is substantially a straight line function, and therefore the offset end 39 of the crankshaft 34 cooperates with the straight edge of the end portion 52 of the pointer element to produce at the indicia 64 the proper movement of the pointer 47 with respect thereto. Thus accurate indications of pressure variations in the chamber 19 are registered at the pointer 47.

It will be noted that the base plate 27 with its lugs 29, 30 and 31 and attachment lugs 57 and 58 may be formed as a stamping from sheet metal, as may also be the pointer element 44 as heretofore pointed out, and as the crankshaft is made by bending a small diametered rod, all of these parts of the present gauge may be readily fabricated at relatively small cost. Assembly of the component elements, as will be apparent from the foregoing description, is also simple and expeditious. Therefore the present invention provides a pressure gauge that may be produced at small cost, and at the same time its construction is such that the parts are held securely in proper relationship without lost motion, so that the existing pressures are at all times accurately represented by the displacement of the pointer under the action of the movable end wall of the bellows 20. Thus a highly efficient gauge is provided in a form that is particularly simple and inexpensive to produce.

While the embodiment of the invention illustrated on the drawing has been described with considerable particularity, it is to be expressly understood that the invention is not restricted thereto as the same may receive other mechanical expressions as will now be apparent to those skilled in the art, while changes may be made in the details of construction, arrangement, material, proportion, etc., of the parts and certain features used without other features without departing from the spirit of this invention. Reference is therefore to be had to the appended claims for a definition of this invention.

What is claimed is:

1. In a pressure gauge, the combination of a flexible wall adapted to be subjected to the pressure to be gauged, a post connected to said flexible wall and movable therewith, a base plate provided with a pair of aligned lugs bent angularly therefrom, one of them being apertured and the other slotted to provide spaced bearings, a crankshaft projected through said aperture and retained in said slot, means on said base plate bearing laterally on said crankshaft to retain said crankshaft in said slot, said crankshaft being provided with laterally bent offset portions at the opposite extremities thereof projecting beyond said bearings for respectively cooperating with said post and a pointer element, a pointer element directly engaged with and movable by said crankshaft, and dial means with which said pointer element cooperates.

2. In a pressure gauge, the combination of a flexible wall adapted to be subjected to the pressure to be gauged, a post connected to said flexible wall and movable therewith, a base plate provided with a pair of aligned lugs bent angularly therefrom to provide spaced bearings for rotatably supporting a crankshaft, one of said lugs being apertured and the other of said lugs having a slot extending inwardly from the lateral edge thereof to receive the crankshaft, a crankshaft hooked through the aperture in one of said lugs and entered laterally into the slot in the other of said lugs, a third lug bent from said base plate and engaged with said crankshaft for retaining said crankshaft in said slot, the opposite ends of said crankshaft being offset for cooperation with said post and a pointer, a pointer element movable by said crankshaft, and dial means with which said pointer element cooperates.

3. In a pressure gauge, the combination of a flexible wall adapted to be subjected to the pressure to be gauged, a post connected to said flexible wall and movable therewith, a base plate through which said post projects, means on said post cooperating with said base plate to provide a stop for movement of said flexible wall, said base plate being provided with angularly bent lugs providing bearings for a crankshaft, a crankshaft rotatably mounted in said lugs and offset at one end beyond the corresponding lug to cooperate with said post, a pivot pin mounted in said base plate, a pointer element rotatably mounted on said pivot pin and provided with a portion offset from but extending parallel to said pivot pin, said crankshaft being offset at its opposite end and beyond its corresponding lug to cooperate with said last-named portion of said pointer element, and dial means with which said pointer element cooperates to indicate pressure, said dial means cooperating with said pivot pin to retain said pointer element on said pin.

4. In a pressure gauge, the combination of a flexible wall adapted to be subjected to the pressure to be gauged, a post connected to said flexible wall and movable therewith, a base plate through which said post projects, said base plate being provided with angularly bent portions to constitute attaching lugs and with other aligned lug portions bent angularly therefrom and providing bearings for a crankshaft, one of said lugs being apertured and the other of said lugs having a slot extending inwardly from its lateral edge, a crankshaft rotatably mounted in said last-named lugs and bent at one end to cooperate with said post, another lug bent angularly from said base plate to retain said crankshaft in said slot, a pivot pin mounted in said base plate, a pointer element rotatably mounted on said pivot pin and provided with a portion offset from but extending substantially parallel to said pivot pin, said crankshaft being bent at its opposite end to cooperate with said named portion of said pointer element, resilient means mounted in one of said attachment lugs and cooperating with said named portion of said pointer element to maintain said portion and crankshaft end in cooperating relationship, said pointer element including a rectangular structure having aligned apertures in opposed sides for cooperation with said pivot pin, and dial means with which said pointer element cooperates, said pointer element including a right angularly bent portion and said dial means having a slot through which said right angularly bent portion extends and with which it cooperates to constitute a stop.

JOHN E. DUBE.